(12) United States Patent
Stengaard et al.

(10) Patent No.: US 6,811,716 B1
(45) Date of Patent: Nov. 2, 2004

(54) POLYOLEFIN FIBERS AND METHOD FOR THE PRODUCTION THEREOF

(75) Inventors: by mming Faurby Stengaard, Varde (DK); Henrik Balslev, Bramminge (DK); Peter Carstensen, Fredericia (DK)

(73) Assignee: FiberVisions A/S, Varde (DK)

( * ) Notice: Subject to any disclaimer, the term of this patent is extended or adjusted under 35 U.S.C. 154(b) by 0 days.

(21) Appl. No.: 09/284,863
(22) PCT Filed: Oct. 23, 1997
(86) PCT No.: PCT/DK97/00467
§ 371 (c)(1),
(2), (4) Date: Apr. 7, 1999
(87) PCT Pub. No.: WO98/17746
PCT Pub. Date: Apr. 30, 1998

Related U.S. Application Data
(60) Provisional application No. 60/029,913, filed on Nov. 4, 1996.

(30) Foreign Application Priority Data

Oct. 24, 1996 (DK) .............................................. 1178/96
Jan. 20, 1997 (DK) .............................................. 0071/97

(51) Int. Cl.⁷ ........................................... D06M 13/02
(52) U.S. Cl. ................... 252/8.61; 252/8.61; 252/8.81; 156/167; 264/205; 264/210.8; 264/290.5; 442/327
(58) Field of Search .............................. 252/8.61, 8.62; 156/167; 264/290.5, 205, 210.8

(56) References Cited

U.S. PATENT DOCUMENTS 4,938,832 A 7/1990 Schmalz
5,494,736 A * 2/1996 Willey et al. ............... 428/288
5,509,142 A * 4/1996 Connell et al. ................... 2/79
5,514,470 A * 5/1996 Haffner et al. .............. 428/246
5,525,243 A * 6/1996 Ross .......................... 252/8.6
5,545,481 A * 8/1996 Harrington .................. 428/361
5,958,806 A * 9/1999 Jensen et al. ............... 264/130

FOREIGN PATENT DOCUMENTS

| EP | 0486158 | 5/1992 |
| EP | 0516412 | 12/1992 |
| EP | 0557024 | 8/1993 |
| WO | 94 20664 | 9/1994 |
| WO | 95 19465 | 7/1995 |

OTHER PUBLICATIONS

Japanese abstract 62–243876 A, Mar. 17, 1999.

* cited by examiner

Primary Examiner—Sam Chuan Yao
(74) Attorney, Agent, or Firm—Birch, Stewart, Kolasch & Birch, LLP (57) ABSTRACT

A method for producing hydrophobic polyolefin-containing fibers or filaments, in particular cardable staple fibers, using spin finishes applied after spinning and stretching, that comprise at least one water-insoluble ester of a mono-, di-, tri- or tetrahydric alcohol with a molecular weight not exceeding 500 and a branched or straight chain fatty acid with between 12 and 30 carbon atoms, e.g. a water-insoluble ester of ethylene or propylene glycol, glycerol, neopentyl glycol, trimethylolethane or trimethylolpropane and at least one saturated or unsaturated fatty acid residue having 12–24 carbons atoms, an anionic or nonionic antistatic agent preferably being applied after crimping; fibers produced by the method; and nonwovens produced from such fibers.

36 Claims, 3 Drawing Sheets

POLYOLEFIN FIBERS AND METHOD FOR THE PRODUCTION THEREOF

This application is the national phase under 35 U.S.C. §371 of PCT International Application No. PCT/DK97/00467 which has an International filing date of Oct. 23, 1997 which designated the United States of America. This application claims the benefit of Provisional application Ser. No. 60/029,913, filed Nov. 4, 1996.

FIELD OF THE INVENTION

The present invention relates to thermobondable polyolefin-containing synthetic fibres or filaments, in particular cardable staple fibres, treated with hydrophobic spin finishes comprising an antistatic agent and a hydrophobic agent, a method for producing the fibres or filaments, and nonwoven products prepared from the fibres or filaments.

The fibres, which have the advantage of being able to be carded at high speeds, are particularly suitable for use in the preparation of thermally bonded hydrophobic nonwoven fabrics in which a dry, water repellent surface which can function as a liquid barrier is desired, e.g. for disposable diapers and feminine hygienic products. The fibres are also suitable for the preparation of thermally bonded nonwoven fabrics for medical use in which a dry, water repellent surface is desired in order to reduce bacterial penetration, for example medical gowns and drapes.

BACKGROUND OF THE INVENTION

Hygienic products such as disposable diapers, sanitary napkins and adult incontinence pads generally have barriers through which fluids absorbed by the absorbent core are not able to penetrate, e.g. in the form of side guards or other structural elements or as back sheet material opposite to the skin. Such barriers may comprise a nonwoven material prepared from hydrophobic staple fibres or a spunbonded material prepared directly from a hydrophobic polymer. However, spunbonded materials are relatively flat and film-like, and do not have the soft, uniform, textile-like comfort that one finds in carded nonwovens. Spunbonded fabrics are therefore not the optimal choice for liquid barriers designed to be in contact with the skin of the user. Also, spunbonded nonwovens have a non-uniform distribution of fibres, which results in weak areas (holes) that limit the liquid barrier properties of the fabrics, so that web uniformity becomes the limiting factor for the hydrophobic characteristics. As for nonwovens prepared from staple fibres, these tend not to be sufficiently hydrophobic for such liquid barriers, due to the fact that during the spinning process, the fibres are treated with a "spin finish" which facilitates the spinning and subsequent carding process by lubricating the fibres and making them antistatic. However, as a result of the spin finish treatment, in particular the use of an antistatic agent, which by nature is more or less hydrophilic, polyolefin fibres, although inherently hydrophobic, become somewhat hydrophilic, which in the present context is undesirable. On the other hand, fibres with the desired degree of hydrophobicity have generally had less than optimal antistatic properties.

Nonetheless, a number of polyolefin-containing hydrophobic synthetic fibres are known, for example hydrophobic textile fibres with dirt and stain resistant properties. However, such fibres generally contain cationic antistatic agents that are undesirable or unsuitable for personal hygiene and medical products for toxicological reasons, since they often exhibit skin irritating properties due to their low pH. Also, some components may during use release di- or tri-ethanolamine, which is suspected of causing allergic reactions. It is also known to treat polyolefin fibres with a finish containing a polysiloxane as the hydrophobic agent, but nonwovens obtained from such fibres often suffer from poor tear strength. It has previously proved difficult to produce fibres for hygienic or medical use with satisfactory hydrophobic properties while maintaining good cardability properties and high nonwoven tenacities. This is particularly important for the many applications in which it is desired that hydrophobic fibres may be carded using high carding speeds.

U.S. Pat. No. 4,938,832 discloses a method for preparing hydrophobic polyolefin-containing fibres or filaments in which spun fibres or filaments are treated with a first modifier composition containing 70–100% by weight of at least one neutralised phosphoric acid ester containing a lower alkyl group and up to 30% by weight of at least one polysiloxane with hydrophobic end groups, followed by treatment with a second modifier composition containing 70–100% by weight of the polysiloxane and up to 30% by weight of the neutralised phosphoric acid ester.

EP 0 486 158 A2 discloses a somewhat similar method for preparing hydrophobic polyolefin-containing fibres or filaments, in which spun fibres or filaments are treated with a first modifier composition containing 0–40% by weight of at least one neutralised phosphoric acid ester containing a lower alkyl group and 60–100% by weight of at least one polysiloxane with hydrophobic end groups, followed by treatment with a second modifier composition containing 50–100% by weight of the neutralised phosphoric acid ester and 0–50% by weight of the polysiloxane.

EP 0 516 412 A2 discloses a method for treating the surface of polyolefin-containing fibres to improve their lubricity and antistatic properties by applying a liquid lubricating finish containing an alkylated polyol or a water-soluble ester or polyester obtained by reacting the polyol with a fatty acid having up to 6 carbon atoms. A polysiloxane and a neutralised phosphoric acid ester may also optionally be applied to the fibres.

EP 0 557 024 A1 discloses polyolefin fibres treated with an antistatic agent which is a neutralised phosphate salt, and optionally with a lubricant selected from mineral oils, paraffinic waxes, polyglycols and silicones, the fibres having an hydrostatic head value of at least 102 mm.

Japanese patent publication No. 4-24463/1992 (application No. 86/84081) discloses polyester fibres coated with a spinning oil consisting of 40–85% by weight of at least one neutral oil with a melting point of 30–150° C., 5–30% by weight of a cationic surfactant, and the balance of an emulsifier. As discussed above, the use of cationic surfactants is, however, undesirable in products designed for personal hygiene or medical use.

WO 94/20664 describes a method for producing cardable, hydrophobic polyolefin-containing staple fibres using two spin finishes, in which the second spin finish is a dispersion comprising an antistatic agent, preferably an anionic or non-ionic antistatic agent, and, as a hydrophobic agent, a natural or synthetic hydrocarbon wax or wax mixture, and optionally a silicone compound.

WO 95/19465 describes a method for producing cardable, hydrophobic polyolefin-containing staple fibres by applying, after spinning, a first spin finish composition containing at least one cationic antistatic agent and, after stretching, a second spin finish composition containing at least one hydrophobic lubricant chosen from a fatty acid amide condensation product and a hydrocarbon wax.

The fibres described in the above-mentioned publications all have various combinations and degrees of hydrophobic and antistatic properties. However, there is still a need for polyolefin fibres with optimum hydrophobic and antistatic properties for the preparation, in particular by means of high-speed carding, of nonwovens with optimum strength and hydrophobic characteristics.

An object of the present invention is therefore to provide hydrophobic thermobondable synthetic fibres, in particular for hygienic applications, with both optimum hydrophobic and antistatic properties, and thus with improved carding properties suitable for preparation of nonwovens showing superior strength and softness. A further object of the present invention is to improve the application and distribution of spin finish on the fibres by carefully controlling the surface properties of the as-spun filaments, thus improving fibre uniformity, allowing increased carding speed and improved web uniformity in the carding process, which in turn results in nonwovens with improved hydrophobic properties.

BRIEF DISCLOSURE OF THE INVENTION

In one aspect, the present invention relates to a method for producing hydrophobic polyolefin-containing fibres or filaments, in particular cardable staple fibres, the method comprising the following steps:

a. melt spinning a polyolefin-containing material to produce spun filaments, b. applying to the spun filaments a first spin finish with an active ingredient content comprising 20–100% by weight of at least one water-insoluble ester of a mono-, di- tri- or tetrahydric alcohol with a molecular weight not exceeding 500 and a branched or straight chain fatty acid with between 12 and 30 carbon atoms, c. stretching the filaments, d. applying to the stretched filaments a second spin finish with an active ingredient content comprising 20–100% by weight of at least one water-insoluble ester of a mono-, di- tri- or tetrahydric alcohol with a molecular weight not exceeding 500 and a branched or straight chain fatty acid with between 12 and 30 carbon atoms, e. optionally, crimping the filaments, f. applying, during the spinning stage, the stretching stage or after crimping, an antistatic agent, g. drying the filaments, and h. for the production of fibres, cutting the filaments to obtain staple fibres.

Further aspects of the invention relate to texturized, cardable, polyolefin-containing fibres produced by the above method, as well as hydrophobic nonwoven materials containing such fibres.

The fibres of the present invention have been found to have excellent hydrophobic properties as well as excellent antistatic properties and can therefore be carded at high carding speeds comparable to carding speeds typically used for hydrophilic staple fibres. It has furthermore been found that webs prepared from the fibres have a uniform distribution of the fibres in both the machine direction and the transverse direction, and that when these webs are thermobonded by calender bonding, nonwovens with improved strength and excellent hydrophobicity are obtained.

DETAILED DISCLOSURE OF THE INVENTION

The term "polyolefin-containing material" for the purpose of this invention means a polymeric material of which the largest part (by weight) consists of homo- or copolymers of monoolefins such as ethylene, propylene, 1-butene, 4-methyl-1-pentene, etc. Examples of such polymers are isotactic or syndiotactic polypropylene, polyethylenes of different densities, such as high density polyethylene, low density polyethylene and linear low density polyethylene and blends of the same. The polymeric material may be mixed with other non-polyolefin polymers such as polyamide or polyester, provided that polyolefins still constitute the largest part of the composition. The melts used to produce the polyolefin-containing fibres may also contain various conventional fibre additives, such as calcium stearate, antioxidants, process stabilizers, compatibilizers and pigments, including whiteners and colourants such as $TiO_2$, etc.

Although the present description will for the sake of simplicity generally refer to "fibres", i.e. cut staple fibres, it is to be understood that the present invention will also be applicable to the production of continuous polyolefin filaments, e.g. spunbonded filaments.

The hydrophobic fibres may be either monocomponent or bicomponent fibres, the latter being for example sheath-core type bicomponent fibres with the core being located either eccentrically (off-center) or concentrically (substantially in the center). Bicomponent fibres will typically have a core and sheath which comprise, respectively, polypropylene/polyethylene, high density polyethylene/linear low density polyethylene, polypropylene random copolymer/polyethylene, or polypropylene/polypropylene random copolymer.

The spinning of the fibres is preferably accomplished using conventional melt spinning (also known as "long spinning"), with spinning and stretching being performed in two separate steps. Alternatively, other means of manufacturing staple fibres, in particular "compact spinning", which is a one step operation, may be used to carry out the invention.

For spinning, the polyolefin-containing material is extruded and the polymer melt is passed through the holes of a spinneret. The extrudates are subsequently cooled and solidified by a stream of air and at the same time drawn into filaments. After having solidified, the filaments are treated with the first spin finish. This is typically performed by means of lick rollers, but alternative systems, such as spraying the bundles of filaments or dipping them in the spin finish, are also suitable.

It has been found by the present inventors that in order to obtain the full advantage of the invention, the spinning conditions must be carefully adjusted. Generally speaking, the hydrophobicity of the fibre and consequently of the non-woven material suffers if the fibre is too highly degraded. On the other hand, if the degradation is too low, the fibres tend to have poor thermobonding properties as well as poor processability on the spinning line. The degradation of the polymer depends on the content of stabilizers in the polyolefin-containing material, the temperature of the extruder and the speed and temperature of the quenching air. A means to determine the level of degradation of the as-spun fibres is to measure the melt flow rate (MFR) of the fibre and compare this with the MFR of the initial polymeric material. In a preferred embodiment of the present invention the MFR of the as-spun fibres is between 1.5 and 7 times the MFR of the raw material, typically between 2 and 5 times the MFR of the raw material. It should be noted however, that this is to a certain extent dependent upon the MFR of the raw material. Thus, the preferred ratio between fibre MFR and raw material MFR will often be slightly lower for a raw material with a relatively high MFR, e.g. 3–5 times for a raw material with an MFR of 10–15 and 2–4 times for a raw material with an MFR of 15–25.

An example of a general method to regulate the ratio between the MFR of the as-spun fibres and the MFR of the raw material is as follows. The fibre MFR is measured at conditions that allow stable spinning, and this value is compared to the MFR of the polymer raw material. If the MFR of the spun fibre is higher than desired in relation to the raw material MFR, the fibre MFR is decreased by reducing the temperature of the extruder and/or by increasing the velocity of the quench air. Conversely, if the fiber MFR is too low, the extruder temperature should be raised and/or the velocity of the quench air lowered.

The stretching process typically involves a series of hot rollers and a hot air oven. The filaments pass first through one set of rollers, followed by passage through a hot air oven, and then passage through a second set of rollers. Both the hot rollers and the hot air oven typically have a temperature of about 50–140° C., e.g. about 70–130° C., the temperature being chosen according to the type of fibre, e.g. typically 115–135° C. for polypropylene fibres, 95–105° C. for polyethylene fibres, and 110–120° C. for polypropylene/polyethylene bicomponent fibres. The speed of the second set of rollers is faster than the speed of the first set, and hence the heated filaments are stretched accordingly. A second oven and a third set of rollers can also be used (two-stage stretching), with the third set of rollers having a higher speed than the second set. Similarly, additional sets of rollers and ovens may be used. The stretch ratio is the ratio between the speed of the last and the first set of rollers. The fibres of the present invention are typically stretched using a stretch ratio of from about 1.05:1 to about 6:1, e.g. from 1.05:1 to 2:1 for polypropylene fibres, and from 2:1 to 4.5:1 for polyethylene fibres and polypropylene/polyethylene bicomponent fibres, resulting in an appropriate fineness, i.e. about 1–7 dtex, typically about 1.5–5 dtex, more typically about 1.6–3.4 dtex, e.g. 1.7–3.3 dtex.

After stretching, the bundles of filaments are treated with the second spin finish, for example using lick rollers or by spraying or dipping.

The stretched fibres are normally texturized (crimped) in order to make the fibres suitable for carding by giving them a "wavy" form. An effective texturization, i.e. a relatively large number of crimps in the fibres, allows for high proccessing speeds in the carding machine, e.g. at least 80 m/min, typically at least 150 m/min or even 200 m/min or more, and thus a high productivity.

Crimping is conveniently carried out using a so-called stuffer box, or, as an alternative, the filaments can be air-texturized. In certain cases, i.e. for asymmetric bicomponent fibres, crimping devices may be eliminated, since heat treatment of such fibres leads to three-dimensional self-crimping.

The fibres of the present invention are typically texturized to a level of about 5–15 crimps/cm, typically about 7–12 crimps/cm (the number of crimps being the number of bends in the fibres).

A third treatment of spin finish may optionally be applied to the filaments after the crimper, e.g. by spraying.

After crimping the filaments are typically led through a hot air oven for fixation and drying. The temperature of the oven depends on the composition of the fibres, but must obviously be below the melting point of the lowest melting component. The temperature of the oven is typically in the range of 90–130° C., e.g. 95–125° C. The heat treatment also removes a certain amount of the water from the spin finishes. The drying process, which is an important factor for the hydrophobicity of the product, allows the hydrophobic lubricant to melt and become distributed uniformly on the surface of the filaments. The residual moisture content is preferably less than 2.0%, more preferably less than 1.5% by weight based on the weight of the fibre.

The dried filaments are then led to a cutter, where the fibres are cut to staple fibres of the desired length. The fibres of the present invention are typically cut to staple fibres of a length of about 18–150 mm, more typically about 25–100 mm, in particular about 30–65 mm.

In the method of the present invention the antistatic is preferably nonionic, such as a phosphate ester, or anionic, such as a phosphate salt. While it is contemplated that cationic antistatic agents also may be used in the context of the present invention, these are less preferred. The antistatic agent may be applied at any of three points on the fibre line, i.e. after spinning, after stretching or after the crimper. In a preferred embodiment, however, the majority or even all of the antistatic agent is applied after the crimper. The reason for this is twofold. Firstly, some of the spin finish tends to be squeezed off before the crimper. At that stage the spin finish is an aqueous dispersion, and therefore the loss of antistatic agent, which is the most hydrophilic substance therein, is most pronounced. Secondly, if the antistatic agent is applied at a too early stage it may hinder the formation of a film by the hydrophobic lubricant. Thus, if the antistatic agent is applied too early, i.e. after spinning or stretching, the resulting fibres tend to have less than optimal antistatic properties due to the squeezing off of the antistatic agent before the crimper and less than optimal hydrophobic properties due to the poor film formation of the hydrophobic agent on the fibre surface. The total amount of antistatic agent applied to the fibres is preferably as low as possible while still achieving the desired antistatic effect, e.g. between 0.01 and 0.50%, preferably between 0.02 and 0.35% and still more preferably between 0.05 and 0.20% by weight based on the weight of the fibres.

The first and a second spin finish compositions, which are applied after spinning and after stretching the filaments, respectively, typically comprise as active ingredients (by weight):

20–100% of the at least one water-insoluble ester,
0–80% of the mineral oil,
0–10% of the ethoxylated alcohol, and
0–30% of an anionic or nonionic antistatic agent.

The first and second spin finish compositions may be different or the same within the above specifications.

In a preferred embodiment one or both of the first and second spin finish compositions comprise as active ingredients:

30–80% of the at least one water-insoluble ester,
20–70% of the mineral oil, and
0.1–5% of the ethoxylated alcohol.

In a more preferred embodiment one or both of the first and second spin finish compositions comprise as active ingredients:

35–65% of the at least one water-insoluble ester,
35–65% of the mineral oil, and
0.5–3% of the ethoxylated alcohol.

The water-insoluble ester component in the hydrophobic lubricant is preferably the reaction product of a polyol having the formula:

$$(R)_m\text{—C—}(CH_2\text{—OH})_{4-m}$$

or in which R is an alkyl group having 1 to 4 carbon atoms; m is 0 to 3 and n is 0 to 4;
and a branched or straight chained fatty acid having between 12 and 30 carbon atoms, preferably between 14 and 26 carbon atoms and more preferably between 16 and 20 carbon atoms. The fatty acid may be saturated or unsaturated. The alcohol can e.g. be ethylene or propylene glycol, glycerol, neopentyl glycol, trimethylolethane or trimethylolpropane. The compound may contain one or more ester group, i.e. it may be a monoester, a diester or a polyester. In the case of compounds with more than one ester group, at least one ester group must be of the type specified above, i.e. an ester of a branched or straight chain fatty acid with 12–30 carbon atoms. The other ester group(s) may thus be of this type or of another type, for example an ester of a short chain carboxylic acid having e.g. 2–6 carbon atoms.

An example of a preferred water-insoluble ester is a low viscosity ester in the form of a monoester of a higher fatty acid ($C_{14}$–$C_{18}$) and a branched chain alcohol, e.g. a tridecyl stearate, in particular isotridecyl stearate, which is an ester of the monohydric alcohol isotridecanol ($_3H_{28}O$) and stearic acid.

One or, preferably, both of the spin finishes preferably also comprise a small amount of a wetting agent which serves to reduce surface tension and thereby provide an improved wetting of the lick rollers which are typically used to apply the spin finishes. The wetting agent should be one which reduces surface tension of the spin finish by at least 2 dynes/cm, preferably at least 3 dynes/cm, more preferably at least 4 dynes/cm. It should also obviously be compatible with the aim of producing hydrophobic fibres and should therefore not be used in an excessive amount which could tend to give the fibres undesired hydrophilic properties. The wetting agent may e.g. be based on a soap, an alcohol or a fatty acid, e.g. a compound selected from the group consisting of glycerides, fatty acid amides, fatty acid amines, polyglycol esters, polyethoxylated amides, nonionic surfactants, anionic surfactants, cationic surfactants, phosphate esters and derivatives (e.g. salts, amines or amides) thereof and blends of the above. In a preferred embodiment, the wetting agent is one which is thermally unstable and which decomposes to volatile compounds when heated, e.g. when the fibres are subjected to thermobonding, so that the wetting agent is not present in the finished nonwoven and therefore does not impair the hydrophobic properties of the nonwoven. The wetting agent is typically present in the spin finish in an amount of about 0.1–2% (% active ingredient by weight based on the total active ingredient content), e.g. 0.3–1%.

An example of a preferred wetting agent for the reduction of surface tension is an amine oxide, e.g. lauramine oxide, $C_{12}H_{25}N(CH_3)_2O$.

In order to reduce fibre/metal friction during stretching, texturization and cutting of the fibres as well as during the carding of the fibres, it is advantageous to add a friction reducing additive to the first and/or second spin finish, typically only the second spin finish. The friction reducing additive typically comprises a wax or wax mixture and/or a silicone compound. In the case of a wax, the wax may be selected from the group of hydrocarbon waxes, including paraffin waxes, microcrystalline waxes, and natural waxes such as insect or plant waxes. Paraffin waxes typically have a melting point in the range of about 45–65° C. while the melting point of microcrystalline waxes is typically in the range of about 50–95° C. (The solidifying point of a hydrocarbon wax is normally about 2–3° C. below the melting point). A preferred wax for the purposes of the present invention is a paraffin wax with a melting point in the range of about 45–60° C., preferably about 48–55° C. (corresponding to paraffin of about $C_{20}$–$C_{34}$), or a mixture of paraffin and/or other waxes having a melting point in this range. It should be noted in this regard that since waxes normally consist of a mixture of different hydrocarbons, this will also typically be the case for the waxes used for the purpose of the present invention. The "wax" will therefore typically be a mixture of different wax types, some of which may be waxes having higher or lower melting points than those given above, as long as the melting point of the total mixture lies within the ranges stated above.

In the case of a silicone (polydiorganosiloxane) compound, this is typically a polydialkylsiloxane of the formula:

in which each R is independently an alkyl group containing 1–4 carbon atoms, phenyl or H, n is a number in the range of 20–3000, and X and Y are each independently OH, $CH_3$, H, O—$CH_3$ or O-acetyl. A preferred polydialkylsiloxane is polydimethylsiloxane.

The content of friction reducing additive in the spin finish is typically in the range of about 0.5–15% (% active ingredient by weight based on the total active ingredient content), e.g. 1–10%.

Further information regarding the use of waxes and silicone compounds as a friction reducing or controlling additive is found in WO 95/19465 and WO 94/20664, to which reference is made.

The amount of spin finish applied after spinning is typically between 0.01 and 0.5%, preferably between 0.05 and 0.30% based on the weight of the fibres. Similarly, an amount of spin finish corresponding to between 0.01 and 0.7%, preferably between 0.10 and 0.50% of the weight of the fibres is typically applied after stretching the filaments.

The total amount of hydrophobic lubricant applied is typically between 0.01 and 1.0%, preferably between 0.03 and 0.7%, e.g. between 0.15 and 0.5% based on the weight of the fibres.

It has found by the present inventors that the total amount of spin finish applied is important for the properties of the fibres. Thus, an overly finished fibre shows less than optimal hydrophobic characteristics, whereas a too meager application of spin finish causes processing problems, especially in the stretching section and in the card.

Measement Methods

The fibres described in the examples below are characterized according to various parameters which are important in determining the hydrophobicity and the bondability of the fibres. Most prominent of these parameters are the melt flow rate (MFR), the amount of finish on yarn (FOY) and the liquid repellency test.

All fibre measurements are carried out at conditions according to ISO 554 Standard Atmosphere (23/50) For PP monocomponent fibres MFR is measured according to ISO 1133-1991 (E), condition No. 12 on a 7.5 g fibre sample which is dried for 15 min. at 100° C. and subsequently cooled at room temperature for 15 min. in a desiccator. Note that the fibers still contain spin finish when the MFR is measured. The MFR of the raw material is determined similarly on a 6.0 g sample of polymer.

The FOY in % of the total weight of fibre is measured on a 10 g fibre sample which is dried at 100° C. for 60 min. and subsequently cooled to room temperature in a desiccator. The fibres are weighed, placed in a conical flask and washed three times with 200 ml of isopropanol. The isopropanol is transferred to a round flask with a known weight and evaporated on a rotary evaporator until dryness. The flask is dried for 1 hour at 45° C., cooled in a desiccator for 30 min. and weighed.

The liquid repellency test (used for determining the "water rising column" value, WRC, of the fibres) is performed as described in EP 0 557 024 A1 except for the following modifications: The column used and the sample holder had inside diameters of 3.95 cm and 4.0 cm, respectively, and the pump speed was maintained at 290 cc/min. The hole through which liquid was added to the column had a diameter of 0.6 cm. Instead of hand-carded fibre, a web from a lab-size card was cut out in circular slices with the same diameter as the sample holder, and 5.0 g+/−0.10 g of these slices were fit into the sample holder.

Cohesion of the carded webs was determined using a simple carding test. This test is carried out by measuring the length a thin carding web of approximately 10 g/m² can support in a substantially horizontal position before it breaks due to its own weight, the length of the carded web being increased at a rate of about 15 m/min. This it performed by taking the web off the card in a horizontal direction at a speed of 15 m/min.

The carding length obtained by this method is a measure of the web cohesion or fibre/fibre friction, a high cohesion giving a high carding length. The fibre/fibre friction is dependent upon factors such as the composition of the spin finish and the degree of texturization, as well as how permanent the texturization is. Fibre/metal friction is also important for the cardability; if it is either too high or too low, the fibres are difficult to transport through the card.

Polyolefin fibres which are well suited for carding will typically be able to support about 1.5 m or more, e.g. 1.5–2.5 m, in the above-described web cohesion length test. Fibres designed for high speed carding should preferably be able to support somewhat more, i.e. at least about 2.0 m.

The strengths of different nonwoven materials in the examples are compared by using a so-called "bondability index" (BI), which compensates for differences in fibre randomization and which is calculated as explained below on the basis of nonwoven tensile strength measured in the machine direction and the cross direction. A standardized carding test for determining the tensile strength of nonwovens is performed as follows:

From about 60–70 kg of fibres, webs with a base weight of 15 20–25 g/m² are produced by carding at the chosen speed at optimum roller settings with respect to uniformity of the web. The webs are subsequently calender bonded, the individual webs being thermobonded at different temperatures at intervals of typically 3° C. within a range chosen according to the type of fibres. For polypropylene fibres, a web with a base weight of about 23 g/m² is prepared by thermobonding at temperatures in the range of 145–157° C., using a calender pressure of 64 N/mm and a typical carding speed of 100 m/min. For bicomponent fibres with a polypropylene core and a polyethylene sheath, a web with a base weight of about 23 g/m$_2$ prepared by thermobonding at temperatures in the range of 137–147° C., with a calender pressure of 40 N/mm and a typical carding speed of 80 m/min. The tensile strengths of the webs are then determined in the machine direction and the cross direction according to the EDANA recommended test:

Nonwovens Tensile Strength, 20 Feb. 1989, which is based on ISO 9073-3:1989 ("Determination of tensile strength and elongation"); however, for the purposes of the present invention the relative humidity was between 50% and 65%. Finally, a bondability index, which is defined as the square root of the product of the machine direction strength and the cross direction strength, is calculated for each of the bonding temperatures.

The hydrophobic properties of nonwovens prepared from the fibres of the invention may be tested according to various methods, including a repellency test and a test for liquid absorbency time. The liquid absorbency test may also be used for testing the hydrophobic properties of fibres, as described below.

The equipment used to measure the repellency (also referred to as "water rising column", WRC) of the nonwoven is a 74 mm inner diameter by 62 cm high column equipped with a ruler. At the bottom of the column are two Plexiglas plates with circular holes in the centers. The holes are surrounded by O-rings made of plastic. The upper plate is connected to the column. The bottom plate is connected to the upper plate by clamps. The sample of nonwoven is placed between the plates. A mirror is placed beneath the sample holder to detect the breakthrough of liquid. Distilled water is fed into the column 10 mm above the surface of the nonwoven sample through a 0.6 cm inner diameter hole in the side at a rate of 1085 cc/min. The WRC test is performed on a circular sample of nonwoven with a diameter of 102 mm, which has been conditioned for at least 2 hours at a temperature of 23° C. and a relative humidity of 50%. The measurement is repeated on three nonwoven samples. The WRC test involves measuring the pressure (expressed as cm water column) required to effect water penetration through a nonwoven subjected to an increasing water pressure. Briefly, a circular section of a nonwoven sample of the desired base weight (typically about 22 g/m²) with a diameter of 74 mm is subjected to a water column whose height increases at a rate of 25 cm/min (10 inches/min), and the repellency of the nonwoven is defined as the height of the water column at the moment when the first drop of water penetrates the sample.

EXAMPLES

Fibres and nonwovens were prepared as follows:

Monocomponent fibers:

The polyolefin raw material (polypropylene of MPR 12 containing calcium stearate and stabilized with Irganox® 3114 and Irgafos® 168, both available from Ciba-Geigy Ltd.) was spun into fibres by conventional spinning (long spinning) technology, using spinning speeds of 1700–2300 m/min, resulting in a bundle of several hundred filaments. After quenching of the filaments by air cooling, the filaments were treated by means of a lick roller with a first spin finish containing the components mentioned below.

The filaments were off-line stretched in a two-stage drawing operation using a combination of hot rollers and a hot air oven, with temperatures in the range of 115–135° C. The stretch ratios were generally in the range of from 1.05:1 to 1.5:1. The stretched filaments were then treated (by means of a lick roller) with different second spin finishes.

The filaments were then crimped in a stuffer-box crimper and subsequently annealed in an oven at a temperature of about 125° C. to reduce contraction of the fibres during the thermal bonding process and to allow the hydrophobic components of the second spin finish to become uniformly distributed on the surface of the filaments. Staple fibres were then produced by cutting the filaments to the desired length.

Bicomponent PE (sheath) and PP (core) fibers:

The bicomponent fibers were produced from polypropylene of MFR 12 and high density polyethylene similarly to the monocomponent fibers, except that the spinning speed was 500–800 m/min, stretching was performed at 90–110° C. with a stretch ratio of from 2.5:1 to 5:1, and the temperature of the annealing oven was about 60° C.

In all the experiments an antistatic agent was sprayed onto the fiber bundle after the crimper.

All of the polypropylene fibres had a fineness of at the most 2.8 dtex, a fibre tenacity of 1.8–2.1 cN/dtex, an elongation at break of 350–420%, and a cut length of 41 or 45 mm, whereas the bicomponent fibres were about 2.2 dtex with a tenacity of 2.2–2.6 cN/dtex and an elongation at break of 120–150%. The fineness of the finished fibres was measured according to DIN 53812/2, and the elongation at break and tenacity of the fibres was measured according to DIN 53816.

Nonwovens were prepared from the various fibres by carding at various speeds and thermally bonding the webs at various temperatures (see Table 1). For each nonwoven, the tensile strength and elongation was measured in both the machine direction and the cross direction as described above (i.e. using the EDANA recommended test), and a bondability index was calculated as described above on the basis of the measured tensile strengths. In addition, the repellency was also determined by the method described above.

In the tables below, the fibre properties of a number of different fibres prepared as described above are given, along with the properties of nonwovens prepared from these fibres.

Table 1 shows the following: the melt flow rate of the spun fibres, the amount of first spin finish applied (active content, in percent by weight of the fibres), the web cohesion length in m, the total amount of spin finish on the fibres (active content, in percent by weight of the fibres), and the water rising column value of the fibres in cm. In addition the following characteristics of nonwovens prepared from the fibres of the experiments are shown in Table 1: the water rising column value measured, the basis weight of the nonwoven sample used for measuring WRC and the maximum bonding index. (Note: the WRC valuesfor the nonwovens in Table 1 are not corrected for the actual nonwoven basis weight. Thus, when comparing WRC values for different nonwovens, the WRC values should be viewed in relation to the basis weight in order to obtain a meaningful comparison).

All of the monocomponent fibres in the examples were produced on a polypropylene raw material with an MFR of 12. When measured according to the EDANA test procedure (10.1–72) on a 10 g sample of carded web, they all showed a sinking time of more than 24 h, indicating that the fibres were highly hydrophobic.

The spin finish system types referred to in Table 1 are described below: (a "theoretical" amount of 0.1% antistatic agent was sprayed onto the fibres as a "standard" treatment, the term "theoretical" referring to the fact that a small amount of the applied antistatic agent is not maintained on the fibre surface).

| SYSTEM | SPIN | STRETCH | SPRAY |
|---|---|---|---|
| I | A | A | B |
| II | A | A | C |

A:
47% neopentyl glycol ester
47% mineral oil
2.5% decaglycerol ester
3.5% ethoxylated alcohols
B:
66.7% alkyl phosphoric acid ester salt (potassium butyl phosphate)
27.6% PEG (polyethylene glycol) phosphate, potassium salt
5.7% glycerol
C:
fatty acid condensation product (Beistat 1107, commercial product from CHT R. Beitlich GmbH, Germany)

TABLE 1

| | Spun fibres | | | Cut fibres | | | Nonwoven | | |
|---|---|---|---|---|---|---|---|---|---|
| Example | MFR | MFI (wet) | FOY % | Carding length (m) | FOY % | WRC cm | WRC (23 g) cm | g/m² "actual" | BI (max) N/5 cm |
| PP fibres - spin finish system type I | | | | | | | | | |
| 1 | 51.5 | | 0.1 | 2.0–2.25 | 0.15 | 15.6 | 7.5 | 21.7 | 25.73 |
| 2 | 44 | | 0.1 | 2 | 0.15 | 19.29 | 9.1 | 21.4 | 23.77 |
| 3 | 58 | | 0.1 | 2 | 0.45 | 10.21 | 8.3 | 25.8 | 25.35 |
| 4 | 54.5 | | 0.1 | 1.5 | 0.2 | 18.19 | 9.2 | 23.4 | 29.96 |
| 5 | 58 | | 0.15 | 1.5 | 0.3 | 18.95 | 5.7 | 23.8 | 23.18 |
| 6 | 30 | | 0.1 | 1.5 | 0.2 | 24.26 | 9.6 | 23.1 | 25.72 |
| 7 | 35 | | 0.2 | 1.25 | 0.3 | 24.52 | 7.1 | 20.4 | 34.51 |
| 8 | 34 | | 0.1 | 1.5 | 0.25 | 22.47 | 8.3 | 20.5 | 29.73 |
| 9 | 34 | | 0.1 | | 0.15 | 25.23 | 10 | 20.4 | 24.11 |
| 10 | 37 | | 0.2 | 1.5 | 0.3 | 27.22 | 8.2 | 22.8 | 22.98 |
| 11 | 28 | | 0.1 | 1.75 | 0.25 | 26.52 | 9.3 | 22.6 | 15.83 |
| 12 | 26 | | 0.1 | 1.75 | 0.25 | 24.95 | 8.8 | 22.6 | 18.4 |
| 13 | 52 | | 0.1 | 1.5 | 0.05 | 23.02 | 9.9 | 26.3 | 28.94 |
| 14 | 46 | | 0.15 | 1.75 | 0.2 | 26.43 | 9.1 | 22.2 | 25.99 |
| 15 | 40 | | 0.15 | 1.5 | 0.2 | 26.59 | 9.3 | 22.2 | 29.27 |
| 16 | 28 | | 0.2 | 1.5 | 0.3 | 27.74 | 10.5 | 24.2 | 22.23 |

TABLE 1-continued

| | Spun fibres | | | Cut fibres | | | Nonwoven | | |
|---|---|---|---|---|---|---|---|---|---|
| Example | MFR | MFI (wet) | FOY % | Carding length (m) | FOY % | WRC cm | WRC (23 g) cm | g/m² "actual" | BI (max) N/5 cm |
| PP/PE bicomponent fibres - spin finish system type I. | | | | | | | | | |
| 17 | | N/A | | 2 | 0.3 | 15.46 | 6.2 | 22 | 13.4 |
| Spin finish system type II (cationic antistatic agent). | | | | | | | | | |
| 18 | 24 | | 0.15 | 1.5 | 0.2 | 8.48 | 6.5 | 23.4 | 19.81 |

Comments on the Fibres in Table 1

Examples 1–2: different melt temperatures resulted in different MFR values for these two fibres.

Examples 3–4: correspond to Examples 1–2 but with different % FOY on the cut fibres.

Example 5: similar to Example 2, but with a different polymer lot.

Example 6: similar to Example 5, but with a lower melt temperature and higher cooling air velocity, resulting in a lower MFR and a higher WRC.

Examples 7–8: similar to Example 6, but with a different % FOY.

Example 9: similar to Example 6, but with half the amount of antistatic agent and half the amount of lubricant applied after spinning.

Examples 10–12: low fibre MFR obtained by varying the cooling air velocity and spinning temperature.

Examples 13–16: variable MFR values.

Example 18: PP fibres similar to Example 6, but with a cationic antistatic agent.

Comments on the test results with reference to the examples in Table 1.

Fiber MFR

Figure 1:
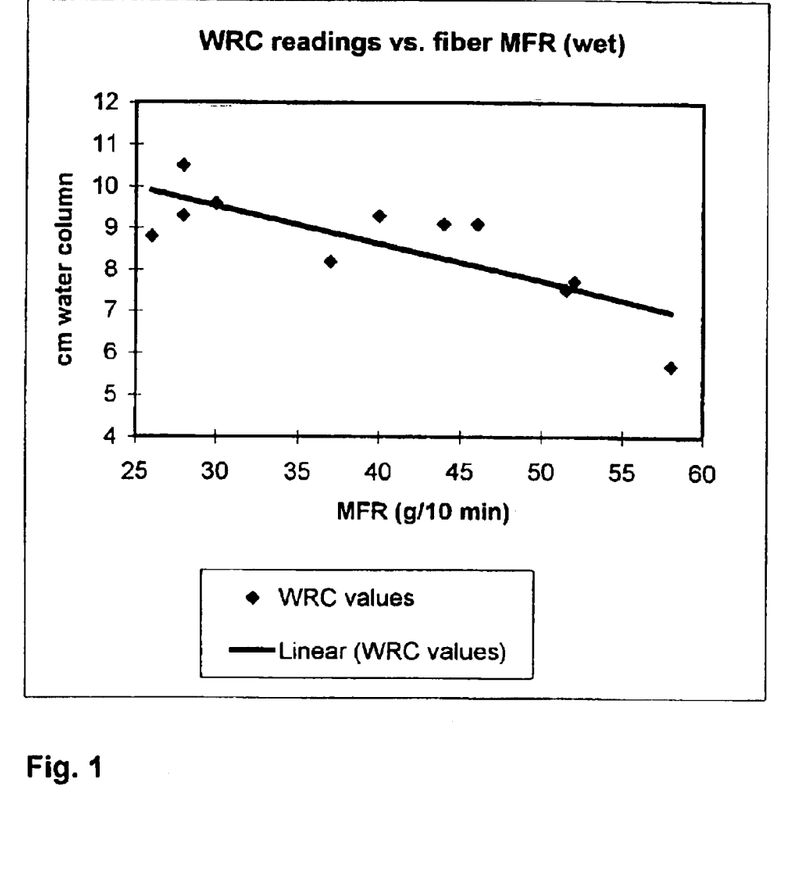

The hydrophobicity (WRC data), at least for polypropylene fibres, is related to the MFR, a lower MFR tending to give a higher WRC value. While not wishing to be bound by any theory, this is believed to be due to the fact that a highly degraded fibre (i.e. a fibre with a high MFR) carries oxidized, i.e. polar, groups on its surface, which render the fiber somewhat hydrophilic, whereas a less degraded fiber (with a lower MFR) inherently has a more hydrophobic surface due to the lack of oxidized groups. FIG. 1 shows a plot of nonwoven WRC data versus fibre MFR for Examples 1, 2, 5, 6 and 10–16 in Table 1. The linear trend curve clearly demonstrates that the tendency mentioned above is valid over a broad range of MFR values.

Figure 2:
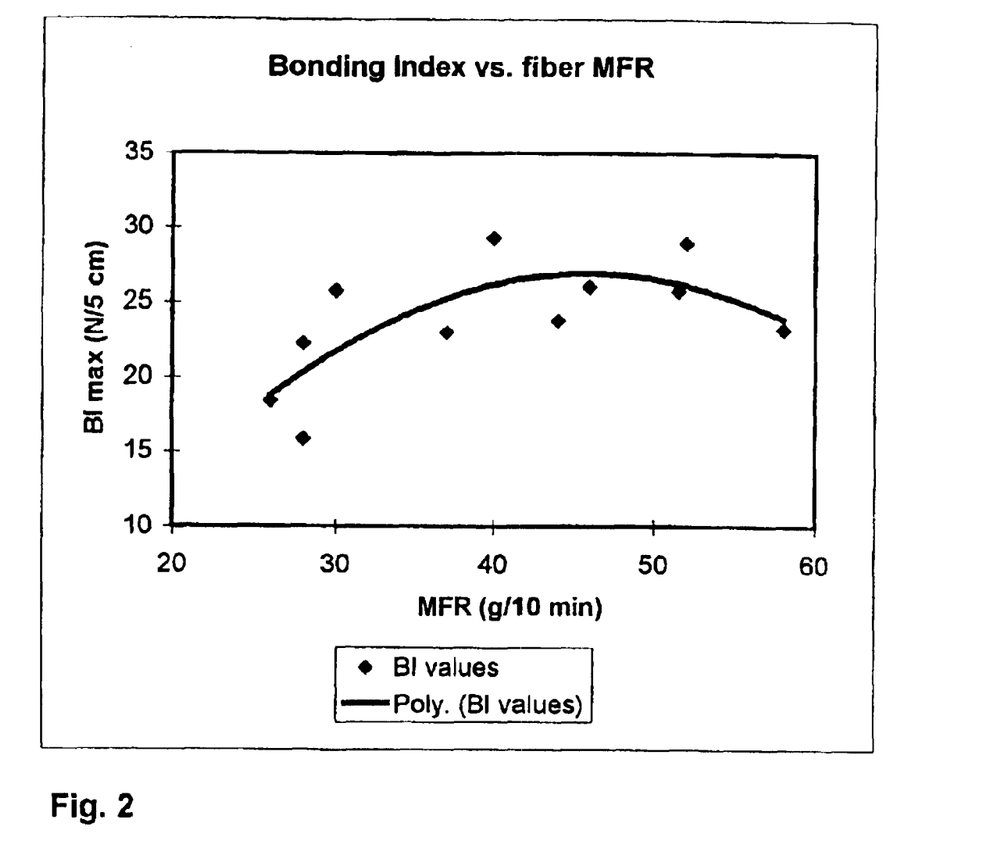

The fibre MFR has an effect on the bonding properties of the fibres as well. For example, a graph of the bonding index in relation to MFR for the polypropylene fibres tested for purposes of the present invention shows a characteristic pattern with increasing bondability index (BI) up to an MFR of about 40–45 g/10 min and then decreasing BI with further increasing MPR (FIG. 2).

Nonwoven Basis Weight

Figure 3:
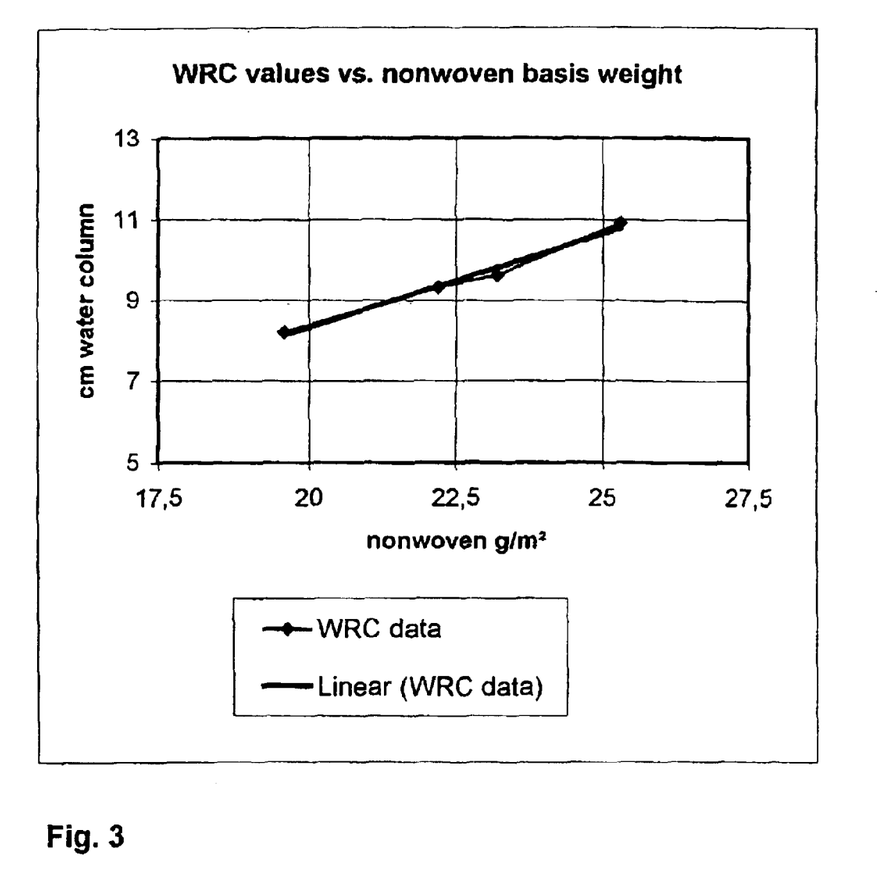

The experiments have shown that at a basis weight of 23 g/cm², WRC values of at least 9 cm are able to be achieved with spin finish system type I at MFR values giving high BI values. Higher basis weights will of course give higher WRC values, while lower basis weights will give somewhat lower values, with more uniform nonwovens giving higher WRC values for the same weight. Table 2 and FIG. 3 show examples of the influence of the nonwoven basis weight on the water rising column (WRC) values.

TABLE 2

WRC values vs. nonwoven basis weight

| Example | MFR | g/m2 "actual" | WRC cm |
|---|---|---|---|
| 13 | 52 | 22.4 | 7.7 |
| | | 26.3 | 9.9 |
| | | 28.2 | 9 |
| | | 32.2 | 11 |
| 14 | 46 | 20.4 | 6.6 |
| | | 22.2 | 9.1 |
| | | 24 | 8.9 |
| | | 28.1 | 9.5 |
| 15 | 40 | 19.6 | 8.2 |
| | | 22.2 | 9.3 |
| | | 23.2 | 9.6 |
| | | 25.3 | 10.9 |
| 16 | 28 | 20.1 | 9.1 |
| | | 24.2 | 10.5 |
| | | 26.9 | 12.1 |

Percent Finish

The percent finish applied to the fibres is not believed to be critical, although there appears to be a tendency for lower finish percentages to give higher WRC values. This is shown by comparing e.g. Examples 3+4 and 7+8. The antistatic agent, being the most hydrophilic ingredient in the spin finish system, is believed to be most critical in this regard, and the amount of antistatic agent should therefore preferably be kept to a minimum. Example 9 shows a large increase in the WRC value when, in addition to a small decrease in lubricant applied after spinning, the amount of antistatic agent sprayed onto the fibres is reduced to 50% of the "standard" amount used in these examples.

Example 18, in which a cationic antistatic agent was used, shows that the use of a cationic antistatic agent has a negative impact on the WRC value. The WRC value in this example is still fairly good, however.

Conclusions

On the basis of these experiments, it may be concluded that the best hydrophobic properties are obtained by operating with a relatively low fibre MFR. Bondability, however, is generally good within a broad MFR range, e.g. a range of about 30–55 for the fibres tested in these examples. It should be noted in this regard that the optimum MFR range for good bondability may be expected to vary depending on the nature of the polymer raw material. For a given polymer and given spinning conditions, etc. it will lie within the ability of a person of ordinary skill in the art to determine the optimum MFR, taking into consideration the fibre characteristics desired in each individual case. The amount of spin finish, while not being believed to be critical, should preferably be kept to a minimum. This applies in particular to the antistatic agent.

What is claimed is:

1. A polyolefin-containing fiber carrying at its surface a hydrophobic finish comprising 0.01–1.0% by weight of the fiber of at least one water-insoluble ester of a mono-, di, tri- or tetrahydric alcohol with a molecular weight not exceeding 500 and a branched or straight chain fatty acid with between 12 and 30 carbon atoms where the water-insoluble ester is present at 35–65% by weight of the finish and said finish further comprising 35–65% of a mineral oil and 0.5–3% of an ethoxylated alcohol.

2. A method for producing a nonwoven material, the method comprising providing a web of fibres according to claim 1 and bonding the web to produce the nonwoven material.

3. A nonwoven material comprising fibres according to claim 1.

4. A non-woven material according to claim 3, having a hydrophobicity, as measured by the WRC test, corresponding to about 9 cm to about 10.5 cm at a basis weight of the non-woven material of 23 g/cm$^2$.

5. A composite material comprising a nonwoven material according to claim 3, wherein said nonwoven material is:
   a. laminated to a film layer or otherwise provided with a film coating; or
   b. bonded to or otherwise provided with a spunbonded layer or a layer of meltblown fibres.

6. A fiber according to claim 1, wherein the fiber is a cardable staple fiber.

7. A polyolefin-containing fiber according to claim 1, consisting essentially of polypropylene, polyethylene or a copolymer thereof.

8. A fibre according to claim 1, wherein the water-insoluble ester is the reaction product of a polyol having the formula:

or in which R is an alkyl group having 1 to 4 carbon atoms; m is 0 to 3 and n is 0 to 4;
with a branched or straight chain fatty acid having between 12 and 30 carbon atoms.

9. A fibre according to claim 8 wherein the polyol is selected from the group consisting of ethylene glycol, propylene glycol, glycerol, neopentyl glycol, trimethylolethane and trimethylolpropane.

10. A fiber according to claim 8, wherein the at least one of said ester is the reaction product of glycerol with at least one saturated or unsaturated fatty acid residue having 12–24 carbon atoms.

11. A fiber according to claim 8, wherein at least one of said ester is a monoester and the reaction product of a fatty acid having 14–18 carbon atoms with a branched chain alcohol.

12. A fiber according to claim 8, carrying at its surface at least one water-insoluble ester comprising the reaction product of glycerol with at least one saturated or unsaturated fatty acid residue having 12–24 carbon atoms; and at least one water-insoluble ester reaction product of neopentyl glycol with at least fatty acid residue having 12–24 carbon atoms.

13. A fiber according to claim 1, wherein the at least one of said ester is a monoester and the reaction product of a fatty acid having 14–18 carbon atoms with a branched chain alcohol.

14. A fiber according to claim 1 carrying at its surface
   at least one water-insoluble ester comprising the reaction product of glycerol with at least one saturated or unsaturated fatty acid residue having 12–24 carbon atoms; and
   at least one water-insoluble ester the reaction product of neopentyl glycol with at least fatty acid residue having 12–24 carbon atoms.

15. A fiber according to claim 1, further comprising an antistatic agent.

16. A fiber according to claim 15, wherein the antistatic agent is anionic or nonionic.

17. A fiber according to claim 15, wherein the antistatic agent has the formula $R^1R^2O_3PO^-M^+$, where $R^1$ and $R^2$ are independently selected from the group consisting of $C_2$–$C_{30}$ alkyl and polyether, and $M^+$ is an alkali metal ion, an ammonium ion or a proton.

18. A fiber according to claim 15, wherein the antistatic agent has the formula $R,1R^2R^3O_3PO$, where $R^1$, $R^2$ and $R^3$ are independently selected from the group consisting of methyl, $C_2$–$C_{30}$ alkyl and polyether.

19. A fiber according to claim 1 further comprising a friction reducing additive comprising a wax or wax mixture and/or a polydiorganosiloxane.

20. A fiber according to claim 1, further comprising a mineral oil and an ethoxylated alcohol.

21. A fiber according to claim 1, having a hydrophobicity, as measured by the WRC test, corresponding to 10.21 to 27.74 cm for cut fibers 1 meter in length.

22. A polyolefin-containing fiber with a hydrophobic finish comprising 0.01–1.0% by weight of the fiber produced by a method comprising the following steps:
   a. melt spinning a polyolefin-containing material to produce spun filaments,
   b. applying to the spun filaments a first spin finish with an active ingredient content comprising 20–100% by weight of at least one water-insoluble ester of a mono-, di-, tri- or tetrahydric alcohol with a molecular weight not exceeding 500 and a branched or straight chain fatty acid with between 12 and 30 carbon atoms, where the water-soluble ester is present at 35–65% by weight of the finish, and said finish further comprising 35–65% of a mineral oil and 0.5 to 3% of an ethoxylated alcohol,
   c. stretching the filaments,
   d. applying to the stretched filaments a second spin finish with an active ingredient content comprising 20–100% by weight of at least one water-insoluble ester of a mono-, di-, tri- or tetrahydric alcohol with a molecular weight not exceeding 500 and a branched or straight chain fatty acid with between 12 and 30 carbon atoms, where the water-soluble ester is present at 35–65% by weight of the finish, and said finish further comprising 35–65% of a mineral oil and 0.5 to 3% of an ethoxylated alcohol,
   e. optionally, crimping the filaments,
   f. applying, during the spinning stage, the stretching stage or after crimping, an antistatic agent,
   g. drying the filaments, and
   h. cutting the filaments to obtain staple fibers.

23. A fiber according to claim 22, wherein the fiber is a cardable staple fiber.

24. A polyolefin-containing fiber according to claim 22, consisting essentially of polypropylene, polyethylene or a copolymer thereof.

25. A fiber according to claim 22, wherein the water insoluble ester is the reaction product of a polyol having the formula:

or in which R is an alkyl group having 1 to 4 carbon atoms; m is 0 to 3 and n is 0 to 4;

with a branched or straight chain fatty acid having between 12 and 30 carbon atoms.

26. A fiber according to claim 22, further comprising an antistatic agent.

27. A fiber according to claim 26, wherein the antistatic agent is anionic or nonionic.

28. A fiber according to claim 26, wherein the antistatic agent has the formula $R^1R^2O_3PO^-M^+$, where $R^1$ and $R^2$ are independently selected from the group consisting of $C_2$–$C_{30}$ alkyl and polyether, and $M^+$ is an alkali metal ion, an ammonium ion or a proton.

29. A fiber according to claim 26, wherein the antistatic agent has the formula $R^1R^2O_3PO^-M^+$, where $R^1$ and $R^2$ and $R^3$ are independently selected from the group consisting of methyl, $C_2$–$C_{30}$ alkyl and polyether.

30. A fiber according to claim 22, further comprising a friction reducing additive comprising a wax or wax mixture and/or a polydiorganosiloxane.

31. A fiber according to claim 22, further comprising a mineral oil and an ethoxylated alcohol.

32. A fiber according to claim 22, having a hydrophobicity, as measured by the WRC test, corresponding to at least 5 cm for cut fibers 1 meter in length.

33. A non-woven material comprising fibers according to claim 22, having a hydrophobicity as measured by the WRC test, corresponding to at least 9 cm at a basis weight of the non-woven material of 23 g/cm².

34. A method for producing a non-woven material, the method comprising providing a web of fibers according to claim 22 and bonding the web to produce the non-woven material.

35. A non-woven material comprising fibers according to claim 22.

36. A composite material comprising a non-woven material according to claim 35, wherein said non-woven material is:

a. laminated to a film layer or otherwise provided with a film coating; or bonded to or otherwise provided with a spunbonded layer of melt blown fibers.

* * * * *

UNITED STATES PATENT AND TRADEMARK OFFICE
CERTIFICATE OF CORRECTION

PATENT NO. : 6,811,716 B1
DATED : November 2, 2004
INVENTOR(S) : Stengaarg et al.

It is certified that error appears in the above-identified patent and that said Letters Patent is hereby corrected as shown below:

Title page,
Item [75], Inventors, please correct to -- Flemming Faurby Stengaard --
Item [86], § 371 (c)(1), (2), (4), please correct the date to -- June 7, 1999 --

Column 16,
Line 23, please amend the formula as follows:
-- $R^1R^2R^3O_3PO$ --

Signed and Sealed this

Tenth Day of May, 2005

JON W. DUDAS
*Director of the United States Patent and Trademark Office*